United States Patent
Markson et al.

(10) Patent No.: US 11,366,834 B2
(45) Date of Patent: Jun. 21, 2022

(54) SYSTEMS AND METHODS FOR MACHINE-AUTOMATED CLASSIFICATION OF WEBSITE INTERACTIONS

(71) Applicant: Express Scripts Strategic Development, Inc., St. Louis, MO (US)

(72) Inventors: Christopher R. Markson, Hawthorne, NJ (US); Adithya Chowdary Boppana, Parsippany, NJ (US); Rahul Rajendran, Hackensack, NJ (US); Pritesh J. Shah, Paramus, NJ (US); Christopher G. Lehmuth, St. Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 169 days.

(21) Appl. No.: 16/923,633

(22) Filed: Jul. 8, 2020

(65) Prior Publication Data
US 2022/0012267 A1 Jan. 13, 2022

(51) Int. Cl.
*G06F 16/00* (2019.01)
*G06F 16/28* (2019.01)
*G06F 16/958* (2019.01)

(52) U.S. Cl.
CPC .......... *G06F 16/285* (2019.01); *G06F 16/958* (2019.01)

(58) Field of Classification Search
CPC .................................................. G06F 16/285
USPC ....................................................... 707/738
See application file for complete search history.

(56) References Cited

U.S. PATENT DOCUMENTS

| | | | | |
|---|---|---|---|---|
| 8,290,768 B1* | 10/2012 | Nelken | ............... | H04M 3/5141 707/706 |
| 8,374,983 B1* | 2/2013 | Pohl | ...................... | G06F 16/954 706/46 |
| 10,552,735 B1* | 2/2020 | Widerhorn | ............. | G06N 20/10 707/707 |
| 10,692,602 B1* | 6/2020 | Nguyen | ................... | G06T 7/11 707/707 |
| 10,853,449 B1* | 12/2020 | Nguyen | ................ | G16H 30/40 707/707 |
| 2010/0146118 A1* | 6/2010 | Wie | ........................ | G06Q 10/10 709/227 |
| 2014/0152665 A1* | 6/2014 | Lu | ......................... | G06T 11/206 345/440 |

(Continued)

*Primary Examiner* — Alexandria Y Bromell
(74) *Attorney, Agent, or Firm* — Miller Johnson

(57) ABSTRACT

A system includes a processor and memory. The memory stores a model database including models and a classification database including classification scores corresponding to an input. The memory stores instructions for execution by the processor. The instructions include, in response to receiving a first input from a user device of a user, determining, for the first input, classification scores for classifications by applying the models to the first input. Each model determines one of the classification scores. The instructions include storing the classification scores as associated with the first input in the classification database and identifying the first input as within a first classification in response to a first classification score corresponding to the first classification exceeding a first threshold. The instructions include transmitting, for display on an analyst device, the first input based on the first classification to a first analyst queue associated with the first classification.

20 Claims, 9 Drawing Sheets

| Level | Model | Category Label | Classification Score | Invalidation | Rank |
|---|---|---|---|---|---|
| Top-Level | First Category Model | Technology | 0.478912 | N | 1 |
| Mid-Level | First Subcategory Model | Mobile Order | 1 | N | 1 |
| | Second Subcategory Model | Account Recovery | 0 | Y | 2 |
| | Third Subcategory Model | Profile Settings | 0 | N | 2 |
| Low-Level | First Nth Level Category | Mobile Website | 0.770833 | Y | 3 |
| | Second Nth Level Category | Order Status | 0.737705 | Y | 4 |
| | First Nth Level Category | Personal Info | 1 | Y | 1 |
| | Second Nth Level Category | Preference | 0.971014 | Y | 2 |
| | Third Nth Level Category | General | 0.716418 | Y | 5 |

(56) References Cited

U.S. PATENT DOCUMENTS

| | | |
|---|---|---|
| 2014/0379616 A1 | 12/2014 | Sun |
| 2016/0189057 A1* | 6/2016 | Rao ................. G06N 20/00 |
| | | 706/12 |
| 2016/0225088 A1 | 8/2016 | Dennis |
| 2017/0228461 A1 | 8/2017 | Lev |
| 2017/0372233 A1 | 12/2017 | Dolan |
| 2018/0032599 A1* | 2/2018 | Larsen ............. G06F 16/285 |
| | | 707/707 |
| 2018/0246883 A1 | 8/2018 | Wang |
| 2018/0293292 A1* | 10/2018 | Odibat ............ G06K 9/6282 |
| | | 707/707 |
| 2018/0367561 A1 | 12/2018 | Givental |
| 2019/0102701 A1 | 4/2019 | Singaraju |
| 2019/0188603 A1 | 6/2019 | Cirit |
| 2019/0260782 A1 | 8/2019 | Dickon |
| 2019/0260783 A1 | 8/2019 | Dickon |
| 2019/0347355 A1* | 11/2019 | Zhang ............. G06K 9/6256 |
| | | 707/707 |
| 2020/0005118 A1 | 1/2020 | Chen |
| 2020/0089806 A1 | 3/2020 | Megahed |
| 2020/0202256 A1 | 6/2020 | Chaudhari |
| 2020/0210885 A1 | 7/2020 | Arora |
| 2020/0311265 A1 | 10/2020 | Jones |
| 2020/0314122 A1* | 10/2020 | Jones ............... H04L 63/1441 |
| | | 707/707 |
| 2020/0394557 A1* | 12/2020 | Boult ............... G06V 10/82 |
| | | 707/707 |

* cited by examiner

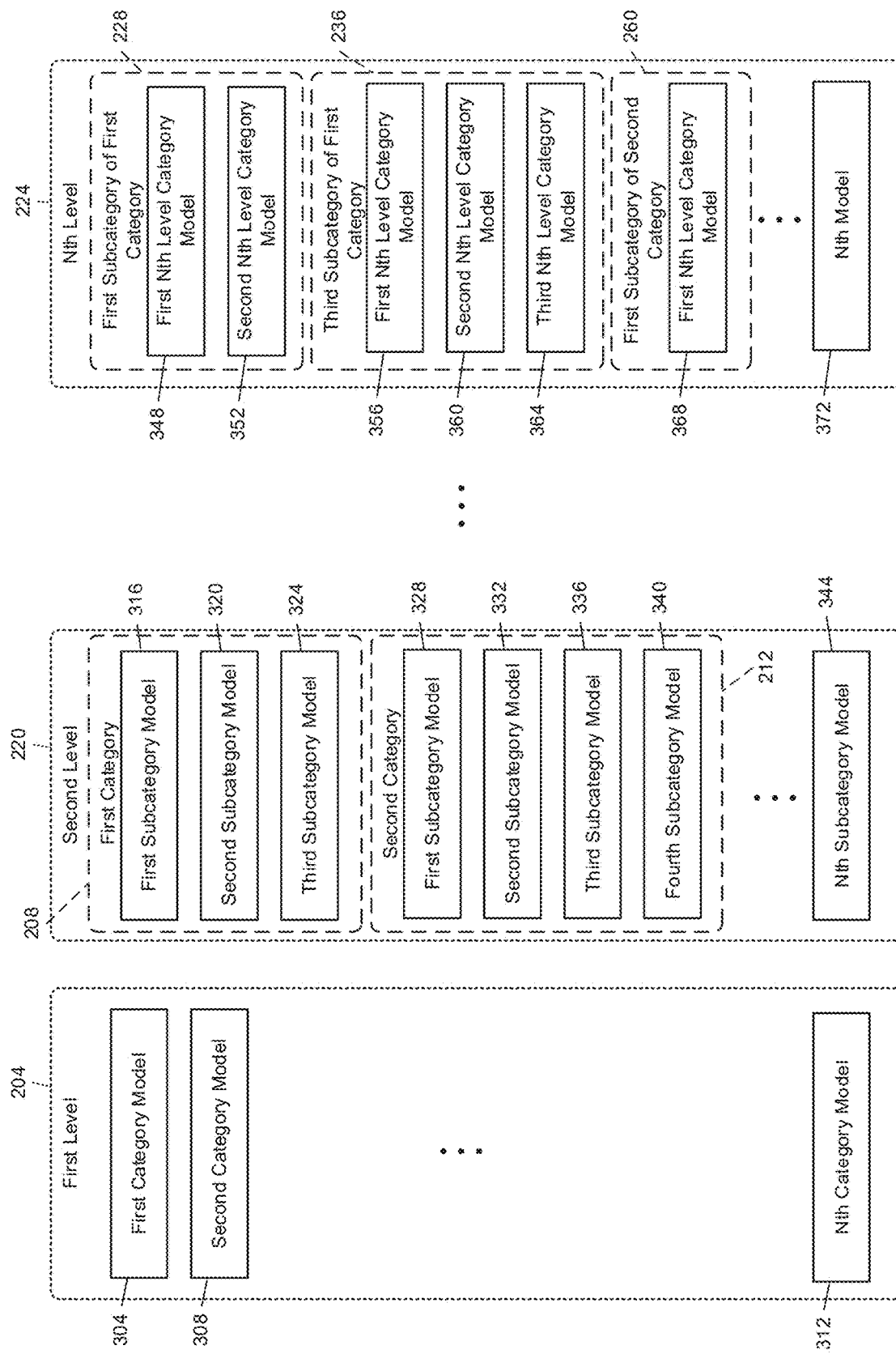

| Level | Model | Category Label | Classification Score | Invalidation | Rank |
|---|---|---|---|---|---|
| Top-Level | First Category Model | Technology | 0.478912 | N | 1 |
| Mid-Level | First Subcategory Model | Mobile Order | 1 | N | 1 |
| | Second Subcategory Model | Account Recovery | 0 | Y | 2 |
| | Third Subcategory Model | Profile Settings | 0 | N | 2 |
| Low-Level | First Nth Level Category | Mobile Website | 0.770833 | Y | 3 |
| | Second Nth Level Category | Order Status | 0.737705 | Y | 4 |
| | First Nth Level Category | Personal Info | 1 | Y | 1 |
| | Second Nth Level Category | Preference | 0.971014 | Y | 2 |
| | Third Nth Level Category | General | 0.716418 | Y | 5 |

FIG. 4A

| Level | Model | Category Label | Classification Score | Invalidation | Rank |
|---|---|---|---|---|---|
| Top-Level | First Category Model | Technology | 0.478912 | N | 1 |
| Mid-Level | First Subcategory Model | Mobile Order | 1 | N | 1 |
| | Second Subcategory Model | Account Recovery | 0 | Y | 2 |
| | Third Subcategory Model | Profile Settings | 0 | N | 2 |
| Low-Level | First Nth Level Category | Personal Info | 1 | Y | 1 |
| | Second Nth Level Category | Preference | 0.971014 | Y | 2 |
| | First Nth Level Category | Mobile Website | 0.770833 | Y | 3 |
| | Second Nth Level Category | Order Status | 0.737705 | Y | 4 |
| | Third Nth Level Category | General | 0.716418 | Y | 5 |

FIG. 4B

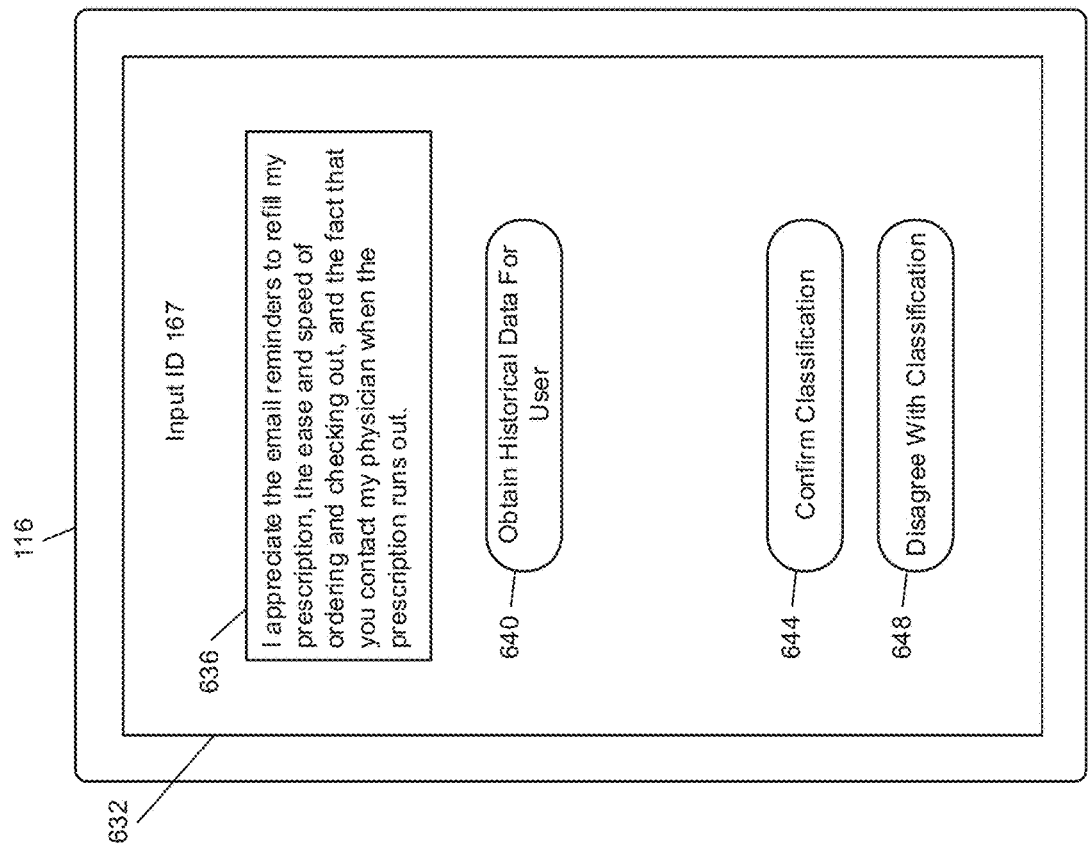
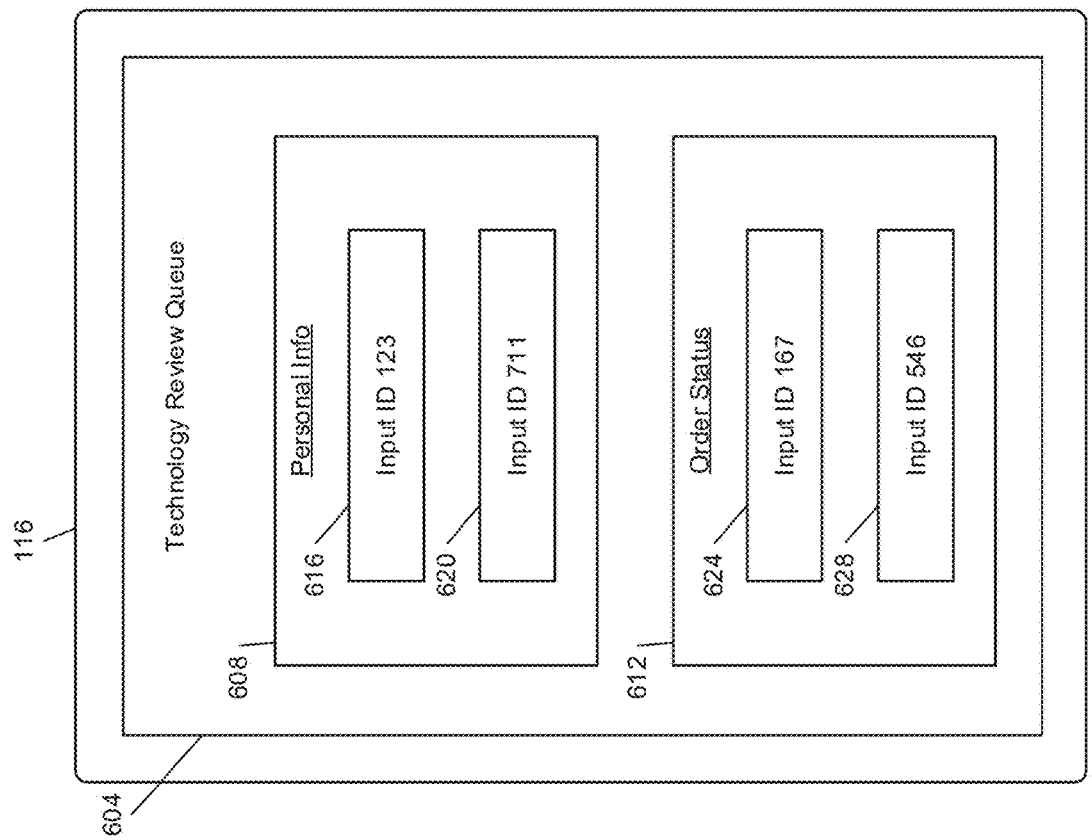

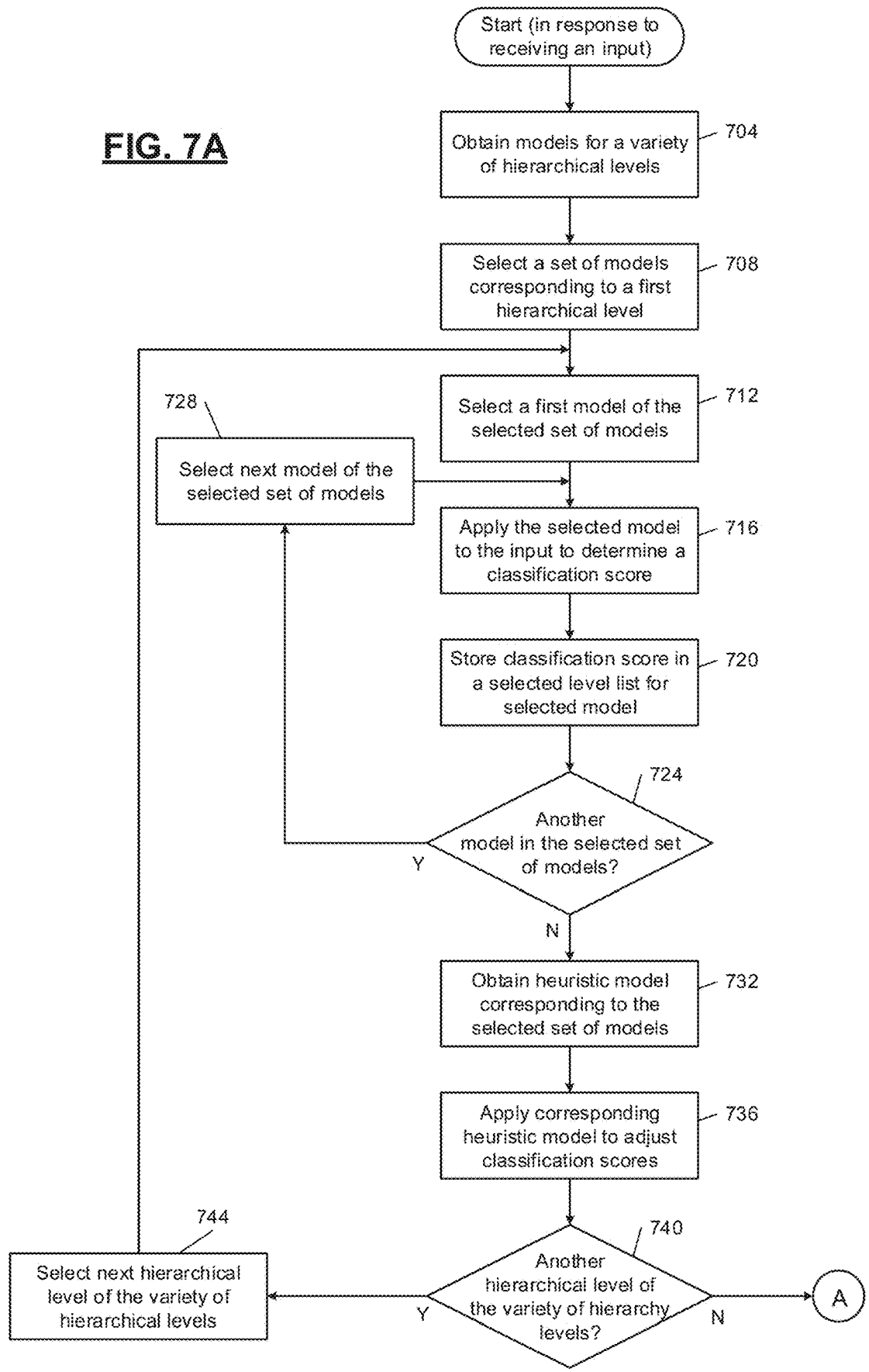

SYSTEMS AND METHODS FOR MACHINE-AUTOMATED CLASSIFICATION OF WEBSITE INTERACTIONS

FIELD

The present disclosure relates to classifying input using machine learning algorithms and more particularly to generating and maintaining review queues of the input based on machine learning classification.

BACKGROUND

Certain entities request and receive a large amount of user feedback regarding the entity's operations through online surveys or online user comments on websites operated by the entity. The large volume of user feedback makes it difficult for analysts associated with the entity to review and perform remedial action to meet user needs and requests. Further, the user feedback may be directed to a specific area of the entity's business, which would be more efficiently reviewed by a particular set of analysts in the related division or group.

An additional issue presented with review of user feedback is that it is often manually categorized or reviewed in a batch process. Therefore, any issues or actionable topics that could be quickly addressed can be waiting for manual review for up to a week or longer. Providing a real-time analysis system improves user experience and increases analyst and entity efficiency.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores a model database including models. Each model of the models includes a classification and a level of a set of levels. The memory stores a classification database including classification scores corresponding to an input. The memory stores instructions for execution by the at least one processor. The instructions include, in response to receiving a first input from a user device of a user, determining, for the first input, classification scores for classifications by applying the models to the first input. Each model determines one of the classification scores. The instructions include storing the classification scores as associated with the first input in the classification database and identifying the first input as within a first classification in response to a first classification score corresponding to the first classification exceeding a first threshold. The instructions include transmitting, for display on an analyst device, the first input based on the first classification to a first analyst queue associated with the first classification.

In other features, each model of the models includes a model threshold and the instructions include, for each model of the models, in response to a corresponding classification score exceeding a corresponding model threshold, identifying the first input as within a corresponding classification. In other features, the instructions include transmitting, for display on the analyst device, the first input to a corresponding analyst queue associated with a corresponding classification. In other features, the set of levels includes: a first level, a second level, and a third level, models indicating the second level are associated with a model indicating the first level, and models indicating the third level are associated with a model indicating the second level.

In other features, the memory stores a heuristic model database including a set of heuristic models. Each heuristic model of the set of heuristics models corresponds to one of the set of levels. In other features, the instructions include applying a first heuristic model of the set of heuristic models to classifications scores of the classification scores generated by models of the models corresponding to a first level. In other features, the instructions include applying a second heuristic model of the set of heuristic models to classifications scores of the classification scores generated by models of the models corresponding to a second level.

In other features, the instructions include, in response to the first classification score corresponding to no category, validating the first classification score and corresponding first model and invalidating remaining classification scores of the classification scores and remaining models of the models. In other features, the memory stores a user parameter database including user and account parameters for users and the instructions include obtaining user parameters for the user from the user parameter database and displaying on the analyst device the obtained user parameters.

In other features, the obtained user parameters include, for the user: a geographical location, an input history, and a benefits plan. In other features, the instructions include updating the models based on feedback from the analyst device and the feedback includes a confirmation of the first classification or a disagreement with the first classification. In other features, the instructions include extracting at least one input feature from the first input and inputting the at least one input feature to the models to generate the classification scores. In other features, the at least one input feature includes at least one of: (i) a word and (ii) a source web page and the source web page corresponds to a web page where the user entered the first input.

A method including, in response to receiving a first input from a user device of a user, determining, for the first input, classification scores for classifications by applying models to the first input. Each model of the models determines one of the classification scores of the classification scores. A model database stores the models and each model of the models includes a classification and a level of a set of levels. The method includes storing the classification scores as associated with the first input in a classification database. The classification database stores classification scores corresponding to an input. The method includes identifying the first input as within a first classification in response to a first classification score corresponding to the first classification exceeding a first threshold and transmitting, for display on an analyst device, the first input based on the first classification to a first analyst queue associated with the first classification.

In other features, the method includes, for each model of the models, in response to a corresponding classification score exceeding a corresponding model threshold, identifying the first input as within a corresponding classification. In other features, the method includes transmitting, for display on the analyst device, the first input to a corresponding analyst queue associated with a corresponding classification. Each model of the models includes a model threshold.

In other features, the set of levels includes: a first level, a second level, and a third level, models indicating the second level are associated with a model indicating the first level, and models indicating the third level are associated with a model indicating the second level. In other features, the method includes applying a first heuristic model of a set of heuristic models to classifications scores of the classification scores generated by models of the models corresponding to a first level. A heuristic model database stores the set of heuristic models and each heuristic model of the set of heuristics models corresponds to one of the set of levels.

In other features, the method includes applying a second heuristic model of the set of heuristic models to classifications scores of the classification scores generated by models of the models corresponding to a second level. In other features, the method includes, in response to the first classification score corresponding to no category, validating the first classification score and corresponding first model and invalidating remaining classification scores of the classification scores and remaining models of the models.

In other features, the method includes updating the models based on feedback from the analyst device. The feedback includes a confirmation of the first classification or a disagreement with the first classification. In other features, the method includes extracting at least one input feature from the first input and inputting the at least one input feature to the models to generate the classification scores. In other features, the at least one input feature includes at least one of: (i) a word and (ii) a source web page and the source web page corresponds to a web page where the user entered the first input.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 3A-3C are example data structures including machine learning models corresponding to the categorization structure depicted in FIG. 2.

FIGS. 4A-4B are example tables including classification scores for an individual input received from a user.

FIGS. 6A-6B are example user interface displays on an analyst device after classification and transmission of input.

FIGS. 7A-7B depict an example flowchart of classification of an input into a category.

In the drawings, reference numbers may be reused to identify similar and/or identical elements.

DETAILED DESCRIPTION

Introduction

Figure 1:
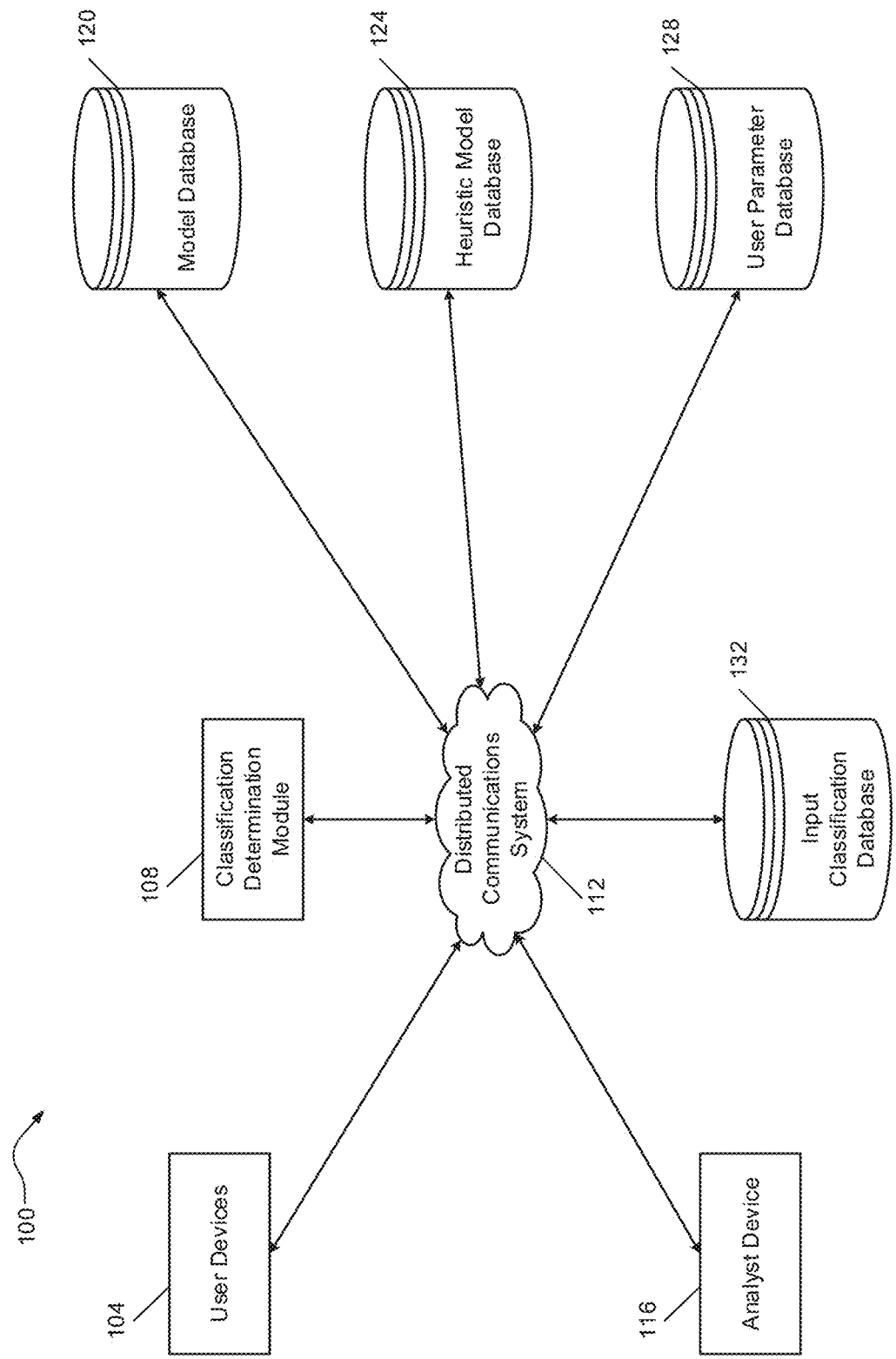
FIG. 1 is a high-level block diagram of an example classification system according to principles of the present disclosure.

A classification system categorizes feedback received from a user—such as a survey answer or comment on a website—into a particular category based on which actionable topic is included in the feedback. The identified actionable topic in the feedback or user input is classified into the particular category so that the user input is reviewed or handled by an analyst or group associated with the actionable topic. For example, the categories or actionable topics can be broadly defined by an entity receiving the feedback. The categories may include, but are not limited to: people, technology, service, and benefits. Further, there may be a specifically-defined "no category". Inputs may be classified into "no category" if they require no action, such as a positive comment on a website saying "Great."

The classification system further includes a variety of categories within each of the broad or top-level categories. The additional categories may be in mid-level or low-level categories that further define the actionable topic included in the input. Each category has a corresponding machine learning model trained to generate a confidence or classification score indicating how closely related the input is to the category. While mid-level and low-level categories exist, the classification system may only generate a high-enough classification score to classify an input into a top-level category.

Additionally, in various implementations, if the top-level models do not determine a high enough classification score to be categorized into any top-level category, the input does not belong to any category. Therefore, the classification system may place the input into "no category." For example, the input is forced into "no category" by adjusting the corresponding classification score to exceed a corresponding threshold.

The models are trained using training data that is categorized manually using actual comments or user feedback. Therefore, the top-level categories will have more training data, resulting in higher accuracy when classifying input into the top-level categories. To account for this, during a post-processing phase of the classification system, the top-level categorizations are considered more accurate than mid-level and low-level categorizations. The post-processing phase reviews classification scores to identify which classification scores can be invalidated to improve overall model accuracy. While this disclosure generally describes three levels, additional or fewer levels may be used.

The post-processing phase includes invalidating classification scores based on other classification scores. As will be described in more detail, if a classification score of the "no category" for a particular input exceeds a particular threshold, the classification system determines that the particular input is categorized in "no category." Therefore, the classification system can invalidate any classification scores for the other categories as being inaccurate because input cannot include no actionable topic and an actionable topic at the same time. This invalidation can further train and improve the accuracy of the corresponding models.

Additionally, the classification system includes multiple heuristic models. A heuristic model is provided for each level of categories and is applied to the input after the corresponding level models generate classification scores. For example, once the top-level models are applied to the particular input, a top-level heuristic model is applied to the particular input to adjust the score based on identification of known terms or phrases, such as business terms, that indicate a particular category.

Once the classification of the particular input is identified, the particular input can be transmitted to an analyst associated with the category for review. The particular input may be queued for review. Additionally, the particular input may be classified into more than one category as a comment or response can be related to more than one category. For example, a comment can relate to technology, such as online ordering, as well as benefits, meaning that the actionable topic may be performed by both or either division.

As an example, the input may be an online comment on an online ordering web page reciting:

> At first I was skeptical about on line ordering medicines and I found out after my first shipment, it was extremely easy to use and it saved me time from having to go to a pharmacy to order refills.

Once the input is received, the classification system can analyze the input to extract features, including the terms, words, or phrases of the input as well as a source or web page where the input was received, providing potential context. In various implementations, the feature extraction also includes identifying a general sentiment of the input, classifying the input as positive or negative. In the above example, the classification system would classify the inputs as positive and related to top-level categories: technology and service. Within technology, the input is classified as directed to a mid-level category, online refill, and further to a low-level category of the mid-level category, refill. Additionally, the input is classified within the service classification as under mid-level category, order fulfillment, and further to a low-level category of the mid-level category, prescription fulfillment.

High-Level Diagram

FIG. 1 is a high-level block diagram of an example classification system 100 according to principles of the present disclosure. The classification system 100 receives input from user devices 104. The input may be solicited in the form of a user survey or may be received as a comment provided by the user on a website operated by an entity associated with the classification system 100. Input may also be received from other sources, including an online chat system, third-party feedback sections, etc. The input may be feedback in the form of a text string. The input is considered user feedback and the classification system 100 classifies the actionable topic included in the input, if an actionable topic exists. The classification system 100 classifies the input into a corresponding category using machine learning models to transmit the input to the appropriate division or analyst associated with the entity for review.

A classification determination module 108 receives the input from user devices 104 via a distributed communications system 112. The classification determination module 108 classifies the input and transmits the input to an analyst device 116 via the distributed communications system 112 based on the classification. In various implementations, the classification determination module 108 receives input in real time as the input is provided by users, for example, via a web portal. The classification determination module 108 obtains data stored in multiple databases, including a model database 120, a heuristic model database 124, and a user parameter database 128.

The model database 120 stores multiple models that implement machine learning algorithms. Each model corresponds to a classification or category in which input can be classified. The models correspond to a particular category at a particular level, such as a top-level model, mid-level model, and low-level model. The models also indicate relationships between the models. For example, a first model may be a top-level model corresponding to a first category and three other models may be mid-level models that are subset categories within the first category of the first model. The model database 120 may also store a threshold classification score for each model. If a classification score exceeds the corresponding threshold, the input is considered categorized into that category.

The heuristic model database 124 also stores heuristic models, each corresponding to a particular level. After the classification determination module 108 applies the models of the model database 120 to the input, a classification score is generated for each model. The classification determination module 108 applies a heuristic model to the input based on the level of each classification score to adjust the classification score based on specifically identified correlations within the input, for example, specific terms or phrases found in the input that should be weighed higher or lower because they indicate a particular category at the corresponding level.

The user parameter database 128 stores information related to users with an account associated with the entity. For example, the entity may be a high-volume pharmacy and healthcare benefits manager. When a user provides feedback in the form of input and the user is logged into their account, the classification determination module 108 can obtain data related to the particular user from the user parameter database 128 to include in the review of the input. For example, the classification system 100 may obtain previous input submitted by the user, a copay or benefit information, location data, etc., of the user. Then, when transmitting the input to the corresponding analyst device 116 based on the classification determined by the classification determination module 108, the input may include a link generated by the classification system 100 for the analyst to review data related to the user along with the input. The classification system 100 also includes an input classification database 132 for storing a table including classification scores for each input.

Classification Structures

Figure 2:
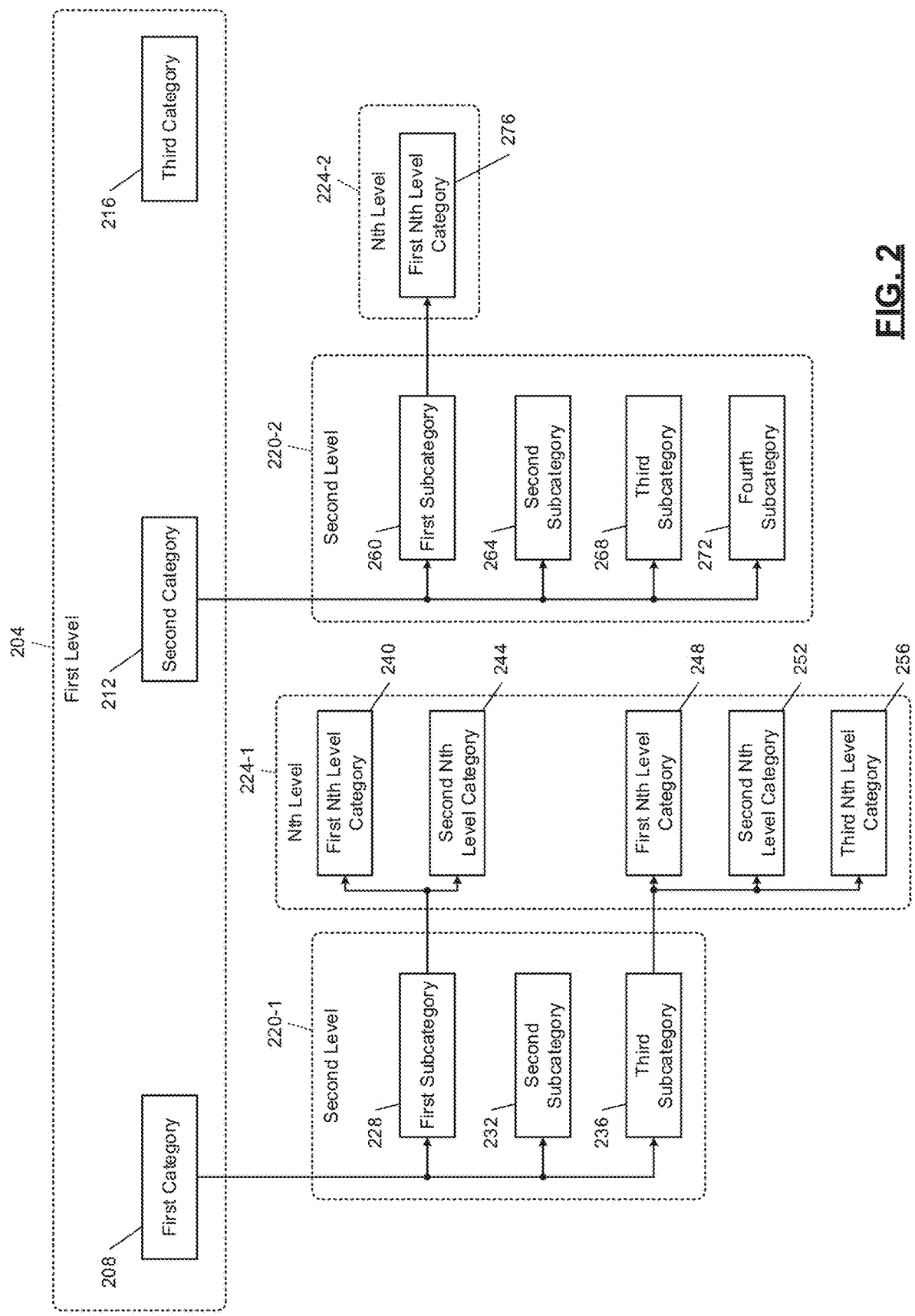
FIG. 2 is a diagram of an example categorization structure for classifying inputs by an example classification system.

FIG. 2 is a diagram of an example categorization structure for classifying inputs by an example classification system. As mentioned above, each category has a corresponding machine learning model applied to the input to calculate a classification score indicating a likelihood or confidence that the input belongs to the category. A first level 204 is a top-level categorization of the input. The top-level includes broad categories such as people, technology, service, benefits, and no category. As shown in FIG. 2, the first level 204 includes a first category 208, a second category 212, and a third category 216. The first level 204 may include fewer or more categories.

The first level 204 categories may be linked to sub level categories, such as a second level 220-1 and second level 220-2, collectively second level 220 and an Nth level 224-1 and Nth level 224-2, collectively Nth level 224. The Nth level 224 represents the lowest or low-level. Additional levels may be included. As shown, the third category 216 does not have any linked categories in a lower level. The first category 208 includes three second level 220-1 categories: a first subcategory 228, a second subcategory 232, and a third subcategory 236. The first subcategory 228 of the first category 208 includes two Nth level 224-1 categories: a first Nth level category 240 and a second Nth level category 244. The second subcategory 232 of the first category 208 does not have additional categories. However, the third subcategory 236 of the first category 208 includes three Nth level 224-1 categories: a first Nth level category 248, a second Nth level category 252, and a third Nth level category 256.

The second category 212 includes four second level 220-2 categories: a first subcategory 260, a second subcategory 264, a third subcategory 268, and a fourth subcategory 272. The first subcategory 260 of the second category 212 is the only second level 220-2 category of the second category 212 to include an Nth level 224-2 category: a first Nth level category 276. For example, the first category 208 may be technology. The second level 220-1 categories within technology may be login (the first subcategory 228), account registration (the second subcategory 232), and profile settings (the third subcategory 236). Then, the Nth level 224-1 categories within, for example, profile settings (the third subcategory 236), may be account personal information (the first Nth level category 248), account preference (the second Nth level category 252), and account general (the third Nth level category 256).

FIGS. 3A-3C are example data structures including machine learning models corresponding to the categorization structure depicted in FIG. 2. FIGS. 3A-3C depict the various levels in a different form from the levels shown in FIG. 2 and showing the variety of models in each level corresponding the categories of FIG. 2. For example, the first level 204 includes a first category model 304, a second category model 308, . . . , and an Nth category model 312. As mentioned, the models implement machine learning algorithms to calculate a classification score related to the corresponding category.

In other words, the first category model 304 implements a machine learning algorithm that is applied to input and generates a classification score between zero and one to indicate a confidence level that the input belongs to the first category. Each category has a corresponding model that is relevant to the particular category and, for each input, some or all the models may be applied to the input to determine which category or which categories that the input most likely belongs.

The second level 220 includes: a first subcategory model 316, a second subcategory model 320, and a third subcategory model 324, which are a subset of the first category 208. In various implementations, the models indicate which top-level, mid-level, and low-level categories or models that are related. The second level 220 includes: a first subcategory model 328, a second subcategory model 332, a third subcategory model 336, and a fourth subcategory model 340, which are a subset of the second category 212. The Nth level 224 includes, within the first subcategory of the first category 228: a first Nth level category model 348 and a second Nth level category model 352. The third subcategory 236 of the first category 208 includes: a first Nth level category model 356, a second Nth level category model 360, and a third Nth level category model 364. The first subcategory 260 of the second category 212 includes a first Nth level category model 368.

Classification Score Table

FIGS. 4A-4B are example tables including classification scores for an individual input received from a user. While the tables are shown with multiple columns, fewer columns may be included in the table as stored or displayed to the user or analyst. For example, the table may exclude the level column. As shown in the example table of FIGS. 4A-4B, for a particular input, each model is applied to the particular input to generate a classification score. The classification score is a value between zero and one. In the example table, a single top-level category is depicted: technology, which the corresponding model determined has a classification score of 0.478912 for the particular input. In various implementations, each model has a corresponding threshold, and, if the classification score of the particular input exceeds the corresponding threshold, the classification system determines that the particular input should be categorized in the corresponding category.

The top-level category technology may include mid-level categories such as mobile order, account recovery, and profile settings. Further, the mid-level category mobile order may include low-level categories such as mobile website and order status. Additionally, the mid-level category profile settings may include low-level categories, such as personal information, preference, and general. Each model is applied to the particular input to generate the classification score. As mentioned previously, prior to finalizing the classification score, a heuristic model for each level is also applied to the input to adjust or weight the classification score based on known terms or phrases that are known to indicate that the particular input belongs or does not belong to a particular category.

In various implementations, the models are provided with feedback during a post-processing step where models are invalidated using a validation flag. As shown in the example table of FIGS. 4A-4B, an invalidation column indicates if a classification score of a particular model was invalidated during post-processing. As described in greater detail later, post-processing operates to provide immediate feedback to the classification system to invalidate a particular classification score based on classification scores of other models. For example, if the classification system determines that the particular input should be categorized in a "no category," meaning that the particular input includes no actionable topic or belongs to no other category, then, during post-processing, the classification scores of every other model are invalidated. This is because the particular input cannot include no actionable topic and belong to category other than the "no category" at the same time.

Similarly, lower level models can be invalidated based on whether the corresponding top-level model indicates the particular input belongs to the top-level category. That is, since more training data exists for the broad, top-level categories, the classification system trusts the top-level models more than the mid-level and low-level models. Therefore, if categorization in a low-level category is indicated by the low-level model classification score while the corresponding mid-level and top-level category is not indicated based on the corresponding classification scores, the low-level classification score is invalidated during post-processing. The post-processing adjusts the categorization in real time while analyzing the particular input and, by including the invalidation column, the invalidated models can be updated according to the invalidations.

As further shown in the FIGS. 4A-4B, the table also includes a rank column. The rank for each category label is within each level. Therefore, there is a ranking within the top-level categories, a ranking within the mid-level categories, and a ranking within the low-level categories. The ranking may be based on the classification scores within the corresponding levels. In various implementations, the categories may be ranked based on highest classification score, in the reverse, or based on another metric of each category, such as a most frequently categorized category, etc. In FIG. 4B, the table is organized based on ranking. In various implementations, the table may be displayed as shown in FIG. 4B, according to ranking. As described, the tables may be used as feedback to the models as well as feedback to individual analyst who may access the tables for each input to determine how the input scored, was ranked, and was classified.

Block Diagram

Figure 5:
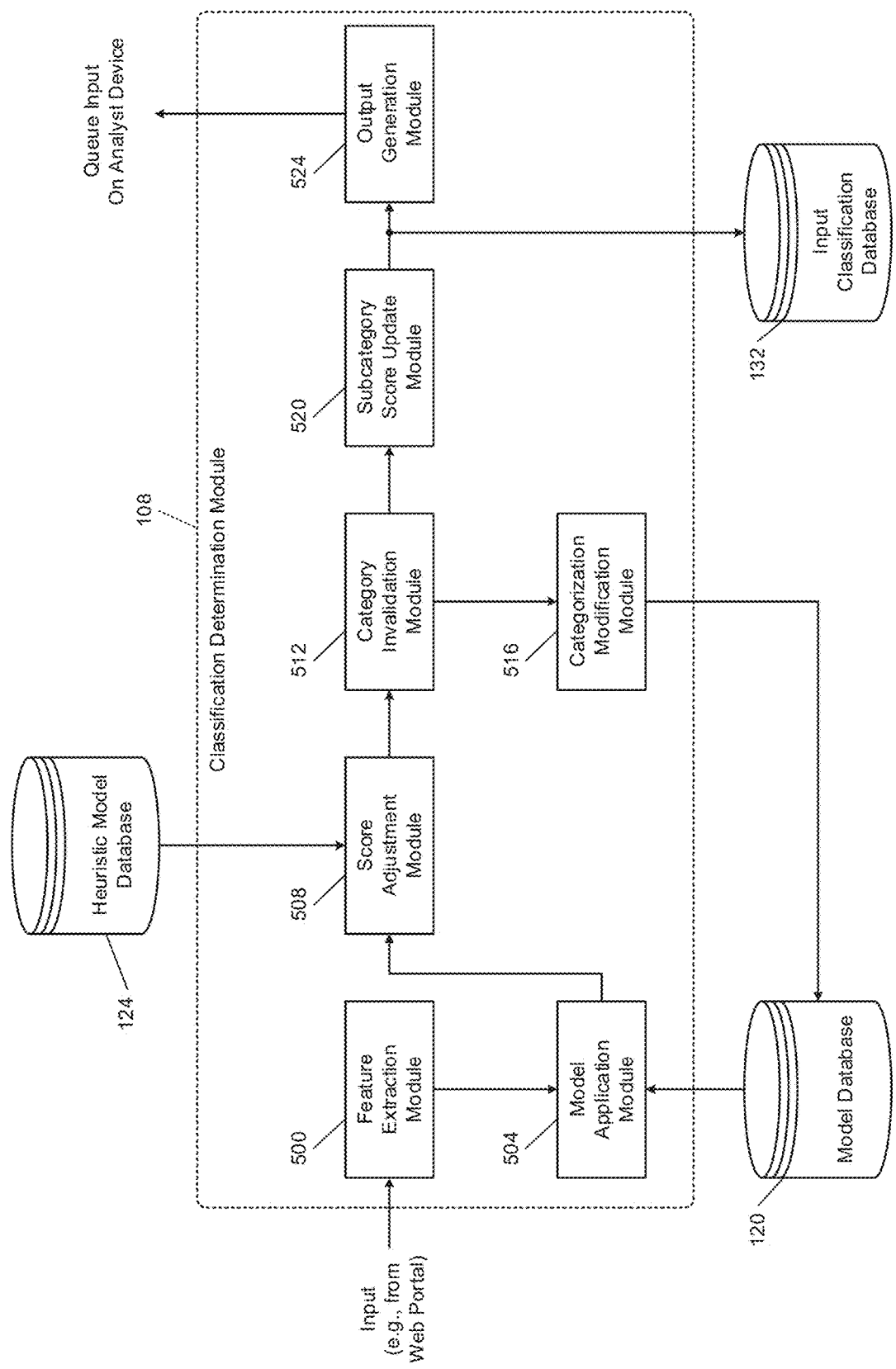
FIG. 5 is a functional block diagram of an example classification determination module within a classification system.

FIG. 5 is a functional block diagram of an example classification determination module 108 within a classification system. The classification determination module 108 receives input from a user device from, for example, a web portal. A feature extraction module 500 receives the input and identifies each term, phrase, or collection of words as an input feature into the machine learning models. Additionally, the feature extraction module 500 identifies a source of the input, such as a web page, to include as an input feature put into the models. The input features are forwarded to a model application module 504 of the classification determination module 108.

The model application module 504 obtains models stored in the model database 120. The model application module 504 applies each model to the input or provides the extracted input features as input for the models. As mentioned, the models stored in the model database 120 implement machine learning algorithms to calculate a classification score for a category associated with the model. The models are trained using a training dataset including previous inputs that humans have been assigned a particular category or categories.

The input received from the web portal are comments or survey responses in the form of a text or numerical string. The models analyze the input according to salient terms or phrases that indicate the corresponding category, increasing the score when more salient terms are included in the input features, weighting the terms accordingly to properly influence the classification score. In various implementations, the models operate to determine a numerical representation of the combination phrases within an input provided to the models as extracted input features. In this way, the numerical representation of the input may indicate a classification or operate as the classification score.

The model application module 504 outputs a classification score corresponding to the models stored in the model database 120 and forwards the classification scores to a score adjustment module 508. The score adjustment module 508 obtains heuristic models from the heuristic model database 124. The heuristic models stored in the heuristic model database 124 include a heuristic model for each level. The heuristic models include a list of triggering words or phrases for, for example, the top-level categories, the mid-level categories, and the low-level categories to adjust the classification scores received from the model application module 504.

For example, the heuristic models may include in a list of words that, if included as an input feature of the input, default classify the input to a particular category. Additionally or alternatively, the heuristic models may include terms that adjust the classification score to reflect a higher or lower likelihood of belonging to a particular category. In various implementations, the heuristic models are created based on manual analysis of a top number of keywords or phrases exclusive to a category.

The score adjustment module 508 adjusts the classification scores according to application of the heuristic models for, in this case, top-level, mid-level, and low-level, and forwards the classification scores to a category invalidation module 512. The category invalidation module 512 performs the post-processing previously discussed. The category invalidation module 512 determines, based on the classification scores, whether other classification scores should be invalidated. As described above, the category invalidation module 512 compares the classification scores at each level and invalidates certain classification scores if conflicting scores exist. The example provided above is that if, at the top level, the input is classified as in the "no category" and the other top-level categories have some minimal score above zero. The category invalidation module 512 marks all other classification scores as invalid because the input cannot be classified as any other model if, at the top level, the input is determined as in the "no category."

Similarly, if the input is categorized as, at the top-level, in technology and people, then the category invalidation module 512 may invalidate the mid-level and low-level models for other top-level categories (as well as the top-level categories). The category invalidation module 512 compares the mid-level classification scores and determines, if one or more mid-level categories are indicated, that the other mid-level and low-level classification scores are invalid.

The category invalidation module 512 forwards low-level classification scores to a categorization modification module 516. The categorization modification module 516 may update any indicated low-level category to stem from a mid-level category that has been indicated in the model database 120 during the low-level classification score check. That is, the categorization modification module 516 identifies low-level classification scores that exceed a corresponding threshold and, if the linked mid-level category is not indicated, may adjust the low-level to stem from a different, indicated mid-level category. This adjustment is intended to improve the accuracy and organization of the classifications and place the low-level category under the more highly indicated mid-level category.

The category invalidation module 512 forwards the classification scores, including scores that have been invalidated, to a subcategory update module 520. The subcategory update module 520 compares the low-level classification scores and may update some of the mid-level classification scores based on the low-level classification score check. For example, in various implementations, if a particular low-level classification score indicates that the input should be categorized into the associated category (and the corresponding mid-level classification score does not), the subcategory update module 520 may adjust the mid-level classification score to reflect the indicated categorization. The subcategory update module 520 forwards the updated classification scores to an output generation module 524 and to the input classification database 132 for storage. An analyst may later access any of the input classification scores from the input classification database 132 using an analyst device according to user, category, etc.

The output generation module 524 transmits the input to an analyst device according to the classification scores. That is, the output generation module 524 may transmit the input to analyst devices associated with each category that has a classification score exceeding a corresponding threshold. The input may be queued at the analyst device for review, generate a review alert, or otherwise be displayed to the appropriate analyst.

User Interface

FIGS. 6A-6B are example user interface displays on the analyst device 116 after classification and transmission of input. FIG. 6A depicts a first user interface 604 on the analyst device 116 titled "Technology Review Queue," indicating that the first user interface 604 is for the top-level category "technology." The technology review queue may be divided according to the mid-level categorization, showing a first section 608 dedicated to input classified as related to "Personal Info" and a second section 612 dedicated to input classified as related to "Order Status."

In various implementations, low-level classifications may be included in the corresponding mid-level section or as a separate section. The first section 608 includes a first user-selectable button 616 labeled as Input ID 123 and a second user-selectable button 620 labeled as Input ID 711. The second section 612 includes a third user-selectable button 624 labeled as Input ID 167 and a fourth user-selectable button 628 labeled as Input ID 546. The analyst may select any of the first, second, third, or fourth user-selectable buttons to be redirected to a second user interface 632 to review the input listed on the button. For example, if the analyst selects the third user-selectable button 624, the second user interface 632 displays the input of the Input ID 167, shown in FIG. 6B.

The second user interface 632 includes an input section 636 that displays the actual content of the input. Here, the input is a comment from a user stating, "I appreciate the email reminders to refill my prescription, the ease and speed of ordering and checking out, and the fact that you contact my physician when the prescription runs out." As shown, the input was received from a user with an account with the entity. Therefore, the second user interface 632 includes a review button 640 labeled "Obtain Historical Data For User." Upon selection by the analyst, the classification system can obtain parameters of the user from the user parameter database 128 shown in FIG. 1.

The second user interface 632 also includes a confirm button 644 labeled "Confirm Classification" and a disagree button 648 labeled "Disagree With Classification." Upon selection of the confirm button 644, the analyst is providing feedback that the input was properly classified. Upon selection of the disagree button 648, the analyst is providing feedback that the input was not properly classified. In various implementations, upon selection of the review button 640 or the confirm button 644, the analyst continues to determine what action to perform, which, in this case, may be to indicate in a file that this particular user appreciates email reminders for prescription refills and potentially offer an automated prescription refill system for this user if they qualify. In various implementations, if the analyst selects the disagree button 648, the analyst may be able to transmit the input to a different analyst or analyst group. The analyst confirmation or disagreement of classifications may be stored in the training dataset for updating the models accordingly.

Flowchart

Figure 7B:
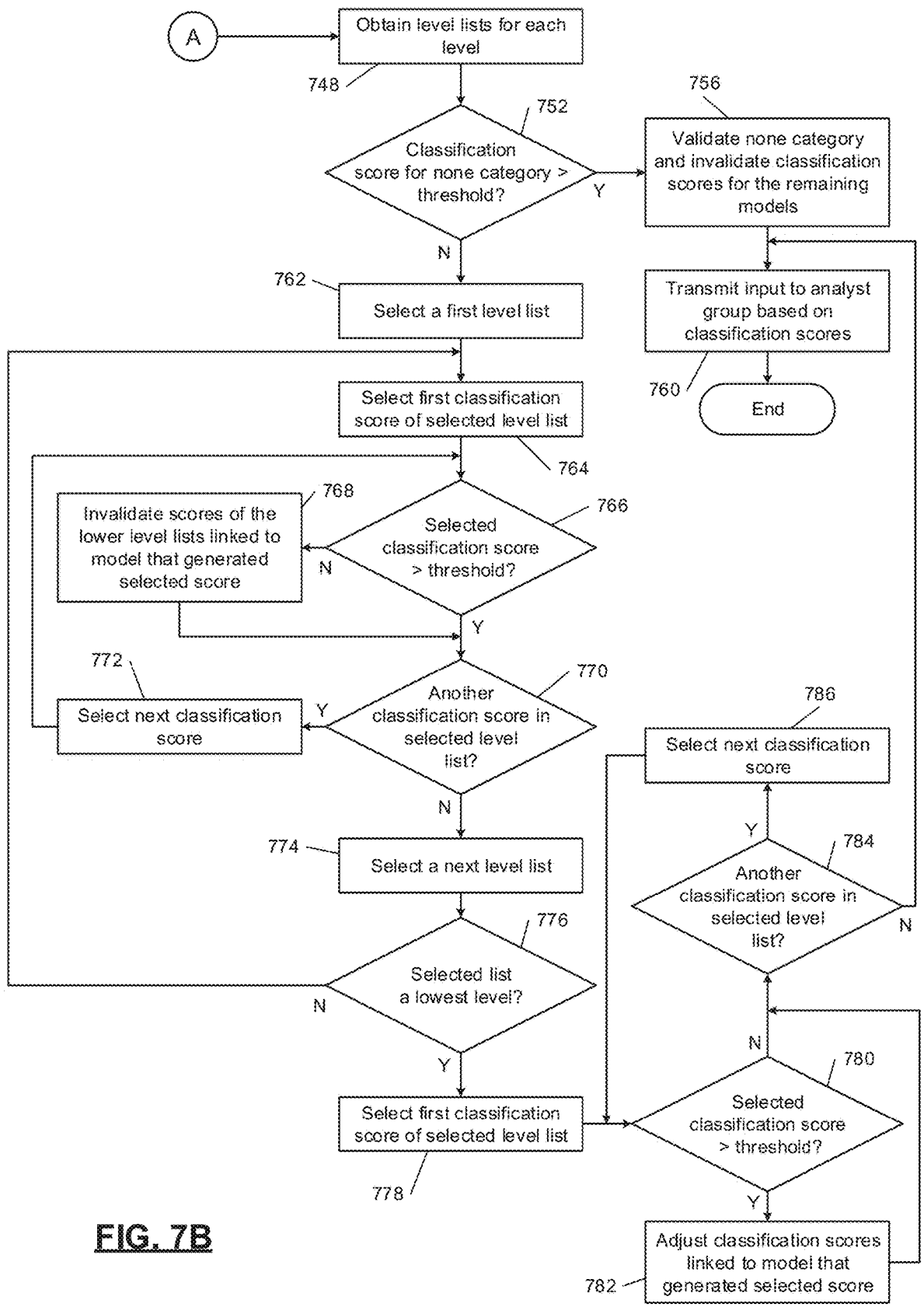

FIGS. 7A-7B depict an example flowchart of classification of an input into a category. Control begins in FIG. 7A in response to receiving an input. At 704, control obtains models for a variety of hierarchical levels. For example, the hierarchical levels include a top-level, a mid-level, and a low-level. Then, control proceeds to 708 to select a set of models corresponding to a first hierarchical level, such as those models categorized in a top-level.

Control continues to 712 to select a first model of the selected set of models. At 716, control applies the selected model to the input to determine a classification score. Control continues to 720 to store the classification score in a selected level list for the selected model. Control proceeds to 724 to determine if another model is in the selected set of models. If yes, control continues to 728 to select the next model of the selected set of models. Then, control returns to 716. Otherwise, if control determines another model is not in the selected set of models, control continues to 732 to obtain a heuristic model corresponding to the selected set of models. As described previously, a heuristic model may be applied to each category level to adjust classification scores based on known terms or phrases that indicate a particular classification or category.

Control continues to 736 to apply the corresponding heuristic model to adjust the classification scores corresponding to the selected set of models. Then, control continues to 740 to determine if another hierarchical level of the variety of hierarchy levels exists. If yes, control proceeds to 744 to select the next hierarchical level of the variety of hierarchical levels. Then, control returns to 712. Otherwise, if at 740 control determines another hierarchical level does not exist, control continues to 748 of FIG. 7B.

At 748, control obtains level lists for each level. The level list are the stored classification scores at each of the hierarchical levels. Control then proceeds to 752 to determine if the classification score of a "no category" model of the top-level categories exceeds a corresponding threshold. If yes, then the classification score of the "no category" model indicates that the input does not belong into any of the categories, top-level or otherwise. Therefore, control proceeds to 756 to validate the "no category" and invalidate each classification score for the remaining models.

Invalidating the classification scores involves adding a binary indication next to each score whether the classification score is valid or invalid, such as a yes or a no. In various implementations, control determines the input belongs to the "no category" when not one of the top-level categories are indicated. Then, control continues to 760 to transmit input to an analyst group based on the classification scores. That is, the input is transmitted to a queue for review by an analyst according to the category or categories into which the input is classified. Then, control ends.

Returning to 752, if the classification score for the "no category" model does not exceed the threshold, then the input has not been classified into the "no category" or no actionable topic. Therefore, control proceeds to 762 to select a first level list. For example, the first selection would be a level list corresponding to top-level categories. Control then continues to 764 to select a first classification score of the selected level list. At 766, control determines if the selected classification score is greater than a corresponding threshold. If no, the input does not belong to the corresponding category of the selected classification score. Therefore, control proceeds to 768 to invalidate classification scores of the lower level lists linked to the model that generated the selected classification score.

Then, control continues to 770 to determine if another classification score is in the selected level list. Control proceeds directly to 770 if, at 766, control determines the selected classification score is greater than the corresponding threshold, indicating the input belongs to the category corresponding to the classification score. If, at 770, another classification score is in the selected level list, control continues to 772 to select a next classification score and returns to 766. Otherwise, if another classification score is not in the selected level list, control proceeds to 774 to select a next level list.

Control continues to 776 to determine if the selected list is the lowest level of the variety of hierarchical levels. If no, control returns to 764. Otherwise, if the selected list is the lowest level list, control proceeds to 778 to select a first classification score of the selected level list. Then, control continues to 780 to determine if the selected classification score is greater than a corresponding threshold.

If yes, control proceeds to 782 to adjust the classification scores linked to the model that generated the selected score. That is, if one of the lower level categories was indicated, the scores of the mid-level and top-level categories may be adjusted to more strongly indicate that the input belongs to the corresponding pathway. In various implementations, if a low-level classification score exceeds a corresponding threshold and the parent mid-level and top-level categories were not indicated, the low-level category may be rearranged into a different mid-level or top-level category that had a classification score that exceeded the corresponding threshold.

Once the classification score is adjusted at 782, control continues to 784 to determine if another classification score is in the selected level list. If, at 780, control determines that the selected classification score did not exceed the corresponding threshold, control continues directly to 784. If another classification score is in the selected level list, control continues to 786 to select a next classification score and returns to 780. Otherwise, if another classification score is not in the selected level list, control proceeds to 760 to transmit the input.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   at least one processor and
   a memory coupled to the at least one processor,
   wherein the memory stores:
      a model database including a plurality of models, wherein each model of the plurality of models includes a classification and a level of a set of levels;
      a classification database including classification scores corresponding to an input; and
      instructions for execution by the at least one processor and
   wherein the instructions include, in response to receiving a first input from a user device of a user:
      determining, for the first input, a plurality of classification scores for a plurality of classifications by applying the plurality of models to the first input, wherein each model of the plurality of models determines one of the classification scores of the plurality of classification scores;
      storing the plurality of classification scores as associated with the first input in the classification database;
      identifying the first input as within a first classification in response to a first classification score corresponding to the first classification exceeding a first threshold; and
      transmitting, for display on an analyst device, the first input based on the first classification to a first analyst queue associated with the first classification.

2. The system of claim 1 wherein:
   each model of the plurality of models includes a model threshold and
   the instructions include, for each model of the plurality of models, in response to a corresponding classification score exceeding a corresponding model threshold:
      identifying the first input as within a corresponding classification and
      transmitting, for display on the analyst device, the first input to a corresponding analyst queue associated with a corresponding classification.

3. The system of claim 1 wherein:
   the set of levels includes: a first level, a second level, and a third level,
   models indicating the second level are associated with a model indicating the first level, and
   models indicating the third level are associated with a model indicating the second level.

4. The system of claim 1 wherein the memory stores:
   a heuristic model database including a set of heuristic models, wherein each heuristic model of the set of heuristics models corresponds to one of the set of levels and
   the instructions include applying a first heuristic model of the set of heuristic models to classifications scores of the plurality of classification scores generated by models of the plurality of models corresponding to a first level.

5. The system of claim 4 wherein the instructions include applying a second heuristic model of the set of heuristic models to classifications scores of the plurality of classification scores generated by models of the plurality of models corresponding to a second level.

6. The system of claim 1 wherein the instructions include, in response to the first classification score corresponding to no category,
   validating the first classification score and corresponding first model and
   invalidating remaining classification scores of the plurality of classification scores and remaining models of the plurality of models.

7. The system of claim 1 wherein:
   the memory stores a user parameter database including user and account parameters for a plurality of users and
   the instructions include obtaining user parameters for the user from the user parameter database and displaying on the analyst device the obtained user parameters.

8. The system of claim 7 wherein the obtained user parameters include, for the user: a geographical location, an input history, and a benefits plan.

9. The system of claim 1 wherein:
   the instructions include updating the plurality of models based on feedback from the analyst device and
   the feedback includes a confirmation of the first classification or a disagreement with the first classification.

10. The system of claim 1 wherein the instructions include:
    extracting at least one input feature from the first input and
    inputting the at least one input feature to the plurality of models to generate the plurality of classification scores.

11. The system of claim 10 wherein:
    the at least one input feature includes at least one of: (i) a word and (ii) a source web page and the source web page corresponds to a web page where the user entered the first input.

12. A method comprising:
in response to receiving a first input from a user device of a user, determining, for the first input, a plurality of classification scores for a plurality of classifications by applying a plurality of models to the first input, wherein:
   each model of the plurality of models determines one of the classification scores of the plurality of classification scores,
   a model database stores the plurality of models, and
   each model of the plurality of models includes a classification and a level of a set of levels;
storing the plurality of classification scores as associated with the first input in a classification database, wherein the classification database stores classification scores corresponding to an input;
identifying the first input as within a first classification in response to a first classification score corresponding to the first classification exceeding a first threshold; and
transmitting, for display on an analyst device, the first input based on the first classification to a first analyst queue associated with the first classification.

13. The method of claim 12 further comprising:
for each model of the plurality of models, in response to a corresponding classification score exceeding a corresponding model threshold:
   identifying the first input as within a corresponding classification and
   transmitting, for display on the analyst device, the first input to a corresponding analyst queue associated with a corresponding classification,
   wherein each model of the plurality of models includes a model threshold.

14. The method of claim 12 wherein:
the set of levels includes: a first level, a second level, and a third level,
models indicating the second level are associated with a model indicating the first level, and
models indicating the third level are associated with a model indicating the second level.

15. The method of claim 12 further comprising:
applying a first heuristic model of a set of heuristic models to classifications scores of the plurality of classification scores generated by models of the plurality of models corresponding to a first level, wherein a heuristic model database stores the set of heuristic models, and wherein each heuristic model of the set of heuristics models corresponds to one of the set of levels.

16. The method of claim 15 further comprising:
applying a second heuristic model of the set of heuristic models to classifications scores of the plurality of classification scores generated by models of the plurality of models corresponding to a second level.

17. The method of claim 12 further comprising:
in response to the first classification score corresponding to no category,
   validating the first classification score and corresponding first model; and
   invalidating remaining classification scores of the plurality of classification scores and remaining models of the plurality of models.

18. The method of claim 12 further comprising:
updating the plurality of models based on feedback from the analyst device, wherein the feedback includes a confirmation of the first classification or a disagreement with the first classification.

19. The method of claim 12 further comprising:
extracting at least one input feature from the first input; and
inputting the at least one input feature to the plurality of models to generate the plurality of classification scores.

20. The method of claim 19 wherein:
the at least one input feature includes at least one of: (i) a word and (ii) a source web page and
the source web page corresponds to a web page where the user entered the first input.

* * * * *